United States Patent

Rosse, III et al.

[11] Patent Number: 5,833,431
[45] Date of Patent: Nov. 10, 1998

[54] WAREHOUSE TRUCK ATTACHMENT AND METHOD FOR THE TRANSPORTATION AND STORAGE OF COMPRESSIBLE ITEMS

[76] Inventors: Sammy A. Rosse, III, 700 Cate; Steven Ray Price, 1201 W. Washington, both of Jonesboro, Ark. 72401

[21] Appl. No.: 811,259

[22] Filed: Mar. 4, 1997

[51] Int. Cl.$^6$ .................................................. B66F 9/12
[52] U.S. Cl. .................... 414/607; 100/100; 100/196; 53/439; 53/447; 53/529; 53/536; 53/540; 414/608; 414/811; 414/814
[58] Field of Search ..................... 414/416, 418, 414/523, 526, 528, 607, 608, 622, 341, 786; 100/100, 196, 144; 53/436, 438, 439, 447, 529, 530, 536, 540

[56] References Cited

U.S. PATENT DOCUMENTS

| | | | |
|---|---|---|---|
| 3,645,060 | 2/1972 | Hammond | 53/24 |
| 3,809,264 | 5/1974 | Mayers | 414/608 X |
| 4,065,003 | 12/1977 | Hostettler | 100/196 X |
| 4,195,963 | 4/1980 | Leukoff et al. | 414/608 X |
| 4,331,419 | 5/1982 | Perrott | 414/283 |
| 4,565,481 | 1/1986 | Pagnoni | 100/196 X |
| 4,579,501 | 4/1986 | Fox | 414/347 |
| 4,708,564 | 11/1987 | Mylrea et al. | 414/36 |
| 4,887,860 | 12/1989 | Dowty | 296/26 |
| 4,906,159 | 3/1990 | Sabo et al. | 414/608 |
| 4,927,316 | 5/1990 | Kordel | 414/510 |
| 5,022,216 | 6/1991 | Muckenfuhs et al. | 53/439 X |
| 5,096,018 | 3/1992 | Dickinson, Jr. | 414/608 X |
| 5,201,427 | 4/1993 | Dowty | 211/23 |
| 5,340,268 | 8/1994 | Dowty | 414/622 |
| 5,509,774 | 4/1996 | Yoo | 414/622 |
| 5,613,435 | 3/1997 | Kukchermann et al. | 100/196 |

FOREIGN PATENT DOCUMENTS

| | | | |
|---|---|---|---|
| 760845 | 6/1967 | Canada | 100/196 |
| 382438 | 11/1964 | Switzerland | 100/196 |
| 1414767 | 8/1988 | U.S.S.R. | 414/607 |

Primary Examiner—David A. Bucci
Attorney, Agent, or Firm—Ray F. Cox, Jr.; J. Charles Dougherty

[57] ABSTRACT

An apparatus and method for the transportation and storage of compressible items in a compressed state, the apparatus comprising a lower member featuring a horizontal floor; an upper member featuring a horizontal roof, the upper member being slideably connected to the lower member; a platform between the floor and roof that is slideably connected to the upper and lower member; a rotational expulsion mechanism attached to the lower member, upper member, and platform; and an attachment point, said attachment point facilitating the connection of the apparatus to a vehicle. Compressible items may be loaded onto the platform, after which the platform is raised so that compressible items may be loaded between the floor and platform. The roof may then be lowered, compressing both those items between the roof and platform and those items between the platform and floor. A rotational mechanism incorporated into the apparatus may be used to expel the compressed items into a container while maintaining them in a compressed state.

12 Claims, 7 Drawing Sheets

WAREHOUSE TRUCK ATTACHMENT AND METHOD FOR THE TRANSPORTATION AND STORAGE OF COMPRESSIBLE ITEMS

FIELD OF THE INVENTION

The present invention relates generally to a warehouse truck attachment that facilitates the economical transport and storage of compressible items. In a typical warehouse operation, the attachment is first loaded with compressible items. Those items are then compressed to a size that will fit within the desired shipping container, such as a boxcar or truck trailer. The attachment may then expel those items into the shipping container while maintaining the items in a compressed state. The attachment features an internal moveable loading platform that allows warehouse personnel to completely load the attachment to a greater height that would normally be possible without requiring the warehouse personnel to use ladders or platforms. The attachment also features internal rotational surfaces that expel compressed items without the need for a separate expulsion unit.

BACKGROUND OF THE INVENTION

The transportation of manufactured items, such as from manufacturer to distributor to retailer, results in a significant increase in the retail cost of such items. This is especially true for items that, due to their shape or structure, occupy a large amount of shipping container space but are of relatively light weight. Many such manufactured items contain a great amount of empty space. The conventional method of shipping such items is to simply stack them inside a standard shipping container, such as a truck trailer or boxcar, until the container is filled. Since the shipping container can typically accommodate much more weight than such items will impart when stacked in this manner, the result is a high shipping cost per unit weight for such items.

Devices that compress such items for shipping are well-known in the prior art. In particular, U.S. Pat. No. 5,340,268, issued to Alvis E. Dowty, teaches such a device that is attached to warehouse trucks. The Dowty '268 patent teaches a device with a horizontal top member that rises to allow items to be stacked within it. The top member is then lowered to compress items within the device. A ram unit is attached that forces items out of the device and into a shipping container while still in a compressed state.

Several limitations are apparent, however, in the device taught by Dowty '268. First, when a standard-size shipping container is used, the device requires that the items be stacked above the reach of shipping personnel. Items are typically placed in such devices by hand, beginning at the floor level. As the stack grows higher, it becomes more difficult for shipping personnel to load the device. In order to load the device with items such that, when compressed, the items will fill a typical shipping container, the uncompressed stack must rise well above the reach of shipping personnel on the ground. This problem is well illustrated by FIG. 4 of the Dowty '268 patent, which depicts a stack of tires in the device before compression takes place. Thus the device taught by Dowty '268 requires warehouse personnel to begin loading the device from ground level, but then finish loading from an elevated platform or other raised surface. Since loading will require shipping personnel to be near the edge of the elevated platform, and moreover will likely require them to lean over that edge to some degree, the device creates a risk that shipping personnel will fall while loading. Although safety devices to protect personnel from injury due to falling could be incorporated into an elevated platform, this would significantly increase the cost and time requirements of the loading process.

A second limitation of the device taught by Dowty '268 is its use of a ram unit for moving compressed items from the device into a shipping container. The ram unit has a vertical surface that moves from the back to the front of the device, thereby pushing out the compressed items in front of it. The requirement of an additional ram unit for expelling items makes the Dowty '268 device bulky and cumbersome. This is an especially acute problem since the device is designed to be attached to warehouse trucks. Such trucks typically must negotiate tight spaces within warehouses, moving around stacks of warehoused items, through doorways, and around walls and columns within the warehouse. The additional length of the attachment makes all such movement slower, more difficult, and more hazardous. In addition, the warehouse truck driver must be able to accurately judge the length of his vehicle in order to load and unload items. The additional length of the warehouse truck caused by the ram unit makes such judgments more difficult and more prone to error, thereby making the loading process less efficient and more hazardous.

SUMMARY OF THE INVENTION

The present invention is directed to a device that, when attached to a warehouse truck, allows for the storage and shipping of compressible items while in a compressed state. The device generally comprises an upper and lower section, the upper section having a horizontally-aligned roof, and the lower section having a horizontally-aligned floor. These upper and lower sections are connected with expansible side members such that the roof may be raised and lowered with respect to the floor. Between the roof and floor is a platform that may move up and down between the roof and floor. When the platform is lowered near the floor, items may be stacked on top of the platform. When the platform is raised, items may be stacked onto the floor under the platform. Thus the device has two separate compartments for the stacking of compressible items. Once fully loaded, the upper section can be lowered to compress the items in both compartments. In one embodiment, the platform may be allowed to float freely during the compression stage so that items both above and below it are held under the same pressure.

In a typical application, the device is first attached to the front of a warehouse truck. The truck is then driven to an area near where the desired items are stored. Those items are then loaded into the device as detailed below. The items are then compressed by forcing the upper section of the device downward. In at least one embodiment, this force may be generated by hydraulic pressure. The warehouse truck may then be driven to a shipping container, such as a truck trailer. Finally, the items may be expelled directly into the shipping container from the device while still in a compressed state. Once inside the container, the container's walls will hold the items in a compressed state until they are unloaded.

In an alternative embodiment adapted to the particular requirements related to loading items into a boxcar, the device may be moved by means other than a forklift or warehouse truck. For example, the device may be self-powered using, for example, hydraulic motors. The device may also be carried by a mobile overhead crane. Such cranes desirably employ hydraulic motors to power wheels that are steerable in any direction for ease of movement.

In contrast to the device taught by Dowty '268, the present invention allows warehouse personnel to safely load items by allowing all loading to take place at ground level.

This is accomplished by loading the device in two stages. The loading process begins with the movable platform lowered to a position near the floor. Compressible items are first stacked onto the platform into an upper compartment formed between the platform and the roof. Once the items are stacked to a certain height, the roof and platform are raised so that items may be stacked onto the floor, in a lower compartment formed between the floor and the platform. Once the lower compartment is filled, the roof and platform are lowered, thereby compressing both the items between the roof and platform, and those between the platform and floor. In a preferred embodiment, the platform may float freely between the roof and floor, thereby equalizing the pressure on each of the two sections of compressed items. In this way, items may be stacked to the same height as in the device taught by Dowty '268, but warehouse personnel may safely complete the stacking process without leaving the ground.

Also in contrast to the Dowty '268 device, the present invention features powered rotational surfaces, which eliminates the need for an additional ram unit to expel compressed items. In a preferred embodiment, the powered rotational surfaces may be motor-driven belts. The rotational surfaces are located so that the loaded items are pressed against them once the unit is loaded and the items are compressed. By rotating these surfaces, the compressed items may be expelled into a shipping container while still in a compressed state. The additional bulk and length of a separate ram unit is not required, since the means for expelling compressed items is incorporated into the device internally.

OBJECTS OF THE INVENTION

An object of the invention is to provide a mechanism for storing and shipping compressible items in a compressed state.

It is a further object of the invention to allow the loading of items within the mechanism without requiring loading personnel to leave the ground.

It is a further object of the invention to expel compressed items from within the mechanism and into a storage or shipping container without requiring an external ram unit. These and other objects and advantages of the present invention will be apparent from a consideration of the detailed description of the preferred embodiments in conjunction with the drawings which are briefly described as follows:

DETAILED DESCRIPTION OF THE PREFERRED EMBODIMENTS

Figure 1:
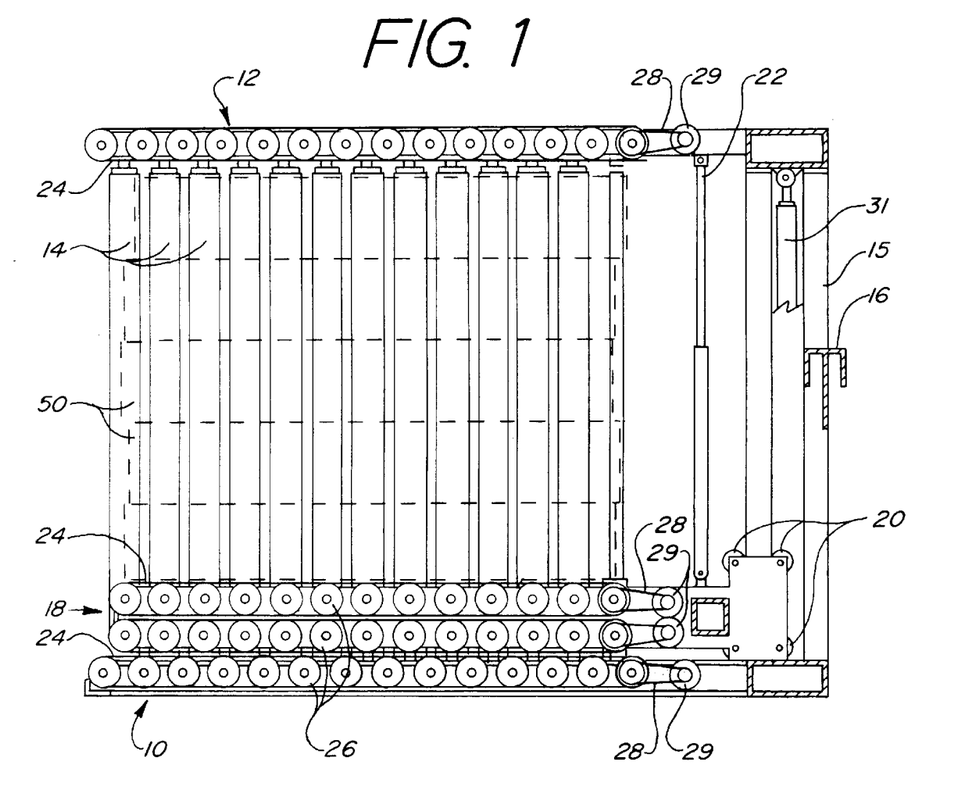
FIG. 1 is a side elevational view, partly in cross section, of a preferred embodiment of the disclosed invention with the platform and roof in the lowered position.

Referring to FIG. 1, the general structure of a preferred embodiment of the disclosed invention may be described. Roof 12 is slidably connected to floor 10 by means of collapsible tubes 14. Each collapsible tube 14 consists of multiple pieces of hollow tubing, each of differing outer and inner diameters. For each collapsible tube 14, the piece of tubing connected to the floor 10 is the widest piece. That piece is connected to the next widest piece in such a way that the next widest piece may slide within the widest piece so that the collapsible tube 14 may contract in a telescoping fashion. This structure is repeated at each connection between pieces of the collapsible tube 14. By each piece sliding within the wider piece below it, the overall length of each collapsible tube 14 may be reduced, thereby drawing roof 12 nearer floor 10. A stop (not shown) on each piece of tubing prevents a piece from sliding completely out of the next wider piece. FIG. 1 shows each collapsible tube 14 in the fully collapsed state, such that roof 12 is in the lowered position. Collapsible tubes 14 forms the sidewalls of two compartments: an upper compartment defined by the roof 12 and the platform 18 and a lower compartment defined by the platform 18 and floor 10.

Figure 6:
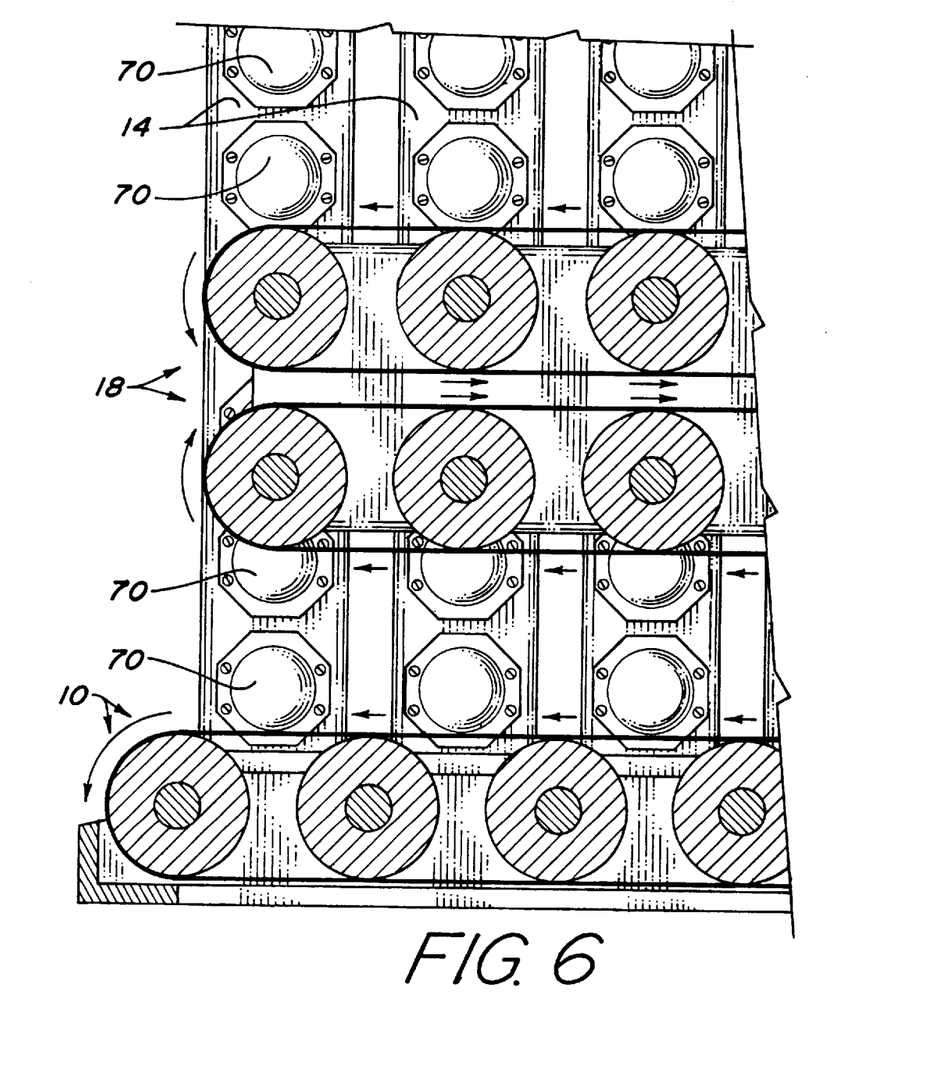
FIG. 6 is a partial elevational view, partly in section, showing omnidirectional rollers arrayed on the collapsible tubes for friction reduction.

The collapsible tubes 14 may be of various shapes, such as circular or square horizontal cross sections. When items 50 (shown in outline) are compressed in the device, there is necessarily pressure of the collapsed items 50 against the sides of the collapsible tubes 14. In order to easily expel the compressed items 50, it is desirable that the friction of the collapsed items 50 against the sides of the collapsible tubes 14 be minimized. When round cross section tubes are employed, the widest telescoping piece of the tubes may be rotatably attached to the floor 10 such that the outermost telescoping piece may rotate freely, thereby allowing the collapsed items 50 to be expelled from the device with minimal friction. If tubes 14 of square cross section or of other cross sectional shapes that are not easily mounted for rotation are employed, the inner surfaces of the tubes 14 may be supplied with a plurality of casters 70 for minimizing friction as shown in FIG. 6. Omnidirectional ball type rollers of the type often employed on material handling conveyors have been found to work acceptably in the practice of the present invention.

Figure 7A:
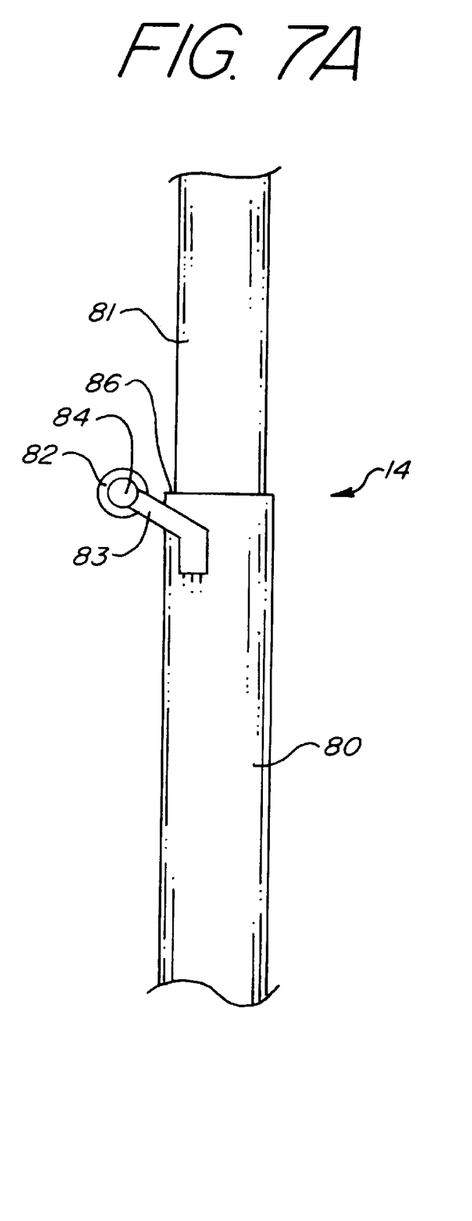
FIG. 7A is a partial front elevation view of a collapsible tube with an anti-pinch roller.
Figure 7B:
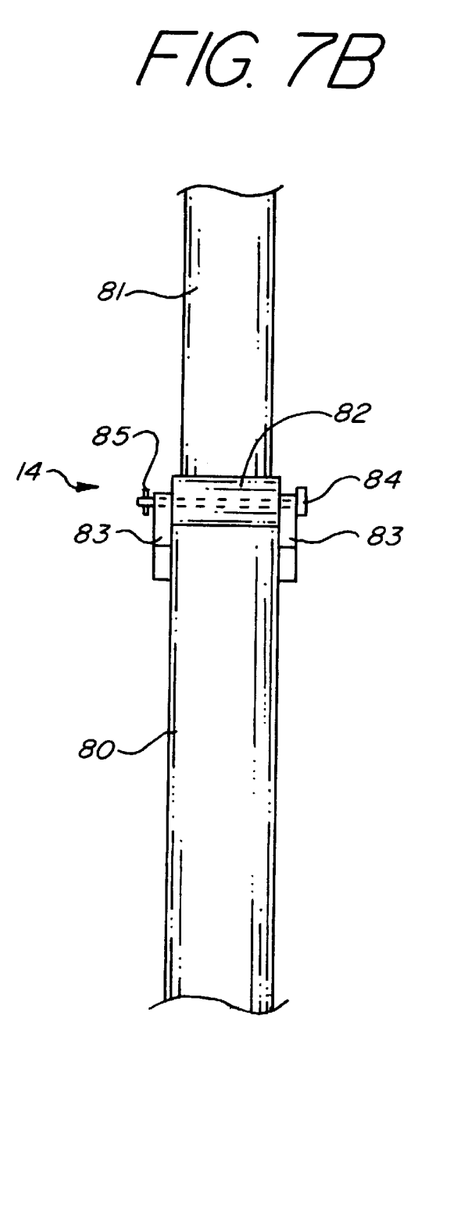
FIG. 7B is a partial side elevation view from the inside of the present invention of a collapsible tube with an anti-pinch roller.

The collapsible tubes 14 may comprise a plurality of two or more telescoping sections. As shown in FIGS. 7A and 7B the collapsible tube 14 may comprise an inner telescoping tube 81 and an outer telescoping tube 80 wherein the inner dimensions of the outer tube 80 are selected so as to slidingly receive the inner tube 81. In like manner a third, fourth, or any higher number of telescoping tubes may be arrayed to form the collapsible tube 14. At the interface where one telescoping tube slides into another, there is a possibility that items loaded into the device may be pinched when the device is compressed and the telescoping tubes slide past one another. In order to avoid this situation, each such interface in the device may be provided with anti-pinch rollers 82. The anti-pinch rollers 82 are supported on roller brackets 83 for free rotation on roller pins 84. The roller pin 84 is held in position by a "C" pin 85 or similar locking device. The roller brackets are attached to the outer telescoping tube 80 so as to support the anti-pinch roller adjacent to the interface 86 where the inner tube 81 is slidingly received in the outer tube 80. Therefore, when the device is collapsed so as to compress items placed in the device as will be described more fully hereinafter, the anti-pinch roller allows the compressed items to slide over the interface 86 without being pulled and pinched between the sliding tubes 80, 81.

Attached to the two rearmost collapsible tubes 15 is attachment point 16. In the illustrated preferred embodiment, attachment point 16 consists of a bar with a pair of hooks adapted to fit onto a standard warehouse truck 40 with its fork assembly removed. These hooks are identical to the hooks commonly used to attach the fork assembly to a warehouse truck 40. In an alternative embodiment, attachment point 16 may consist of an assembly to receive the tines of a fork assembly attached to a warehouse truck 40. Such an assembly may be mounted under floor 10. In this alternative embodiment, there would be no need to remove the fork assembly from a warehouse truck 40 before using the device.

Platform 18 is cantilevered out from one pair of the rearmost collapsible tubes 15, such that it may move vertically between floor 10 and roof 12. In the illustrated preferred embodiment, platform 18 rides along collapsible tubes 14 on casters 20. The roof 12 is connected to the platform 18 by telescoping load levelers 22. The telescoping load levelers 22, when fully extended, are shorter than the fully extended length of the collapsible tubes 14 so that when the roof 12 is lowered as shown in FIG. 1, the platform 18 is also lowered to rest on the floor 10. But when the roof 12 is raised to the fully extended position shown in FIG. 2, the telescoping load leveler 22 only extends to a lesser length than that of the collapsible tubes 14, thus lifting the platform 18 to an intermediate position between the roof 12 and the floor 10. When both the upper and lower compartments are filled with compressible items 50 (shown in outline in FIGS. 1, 2, and 3), the telescoping load levelers 22 freely retract, thereby allowing the platform 18 to float between the roof 12 and the floor 10 to achieve a balance between the compression of the items 50 in the upper compartment and the items 50 in the lower compartment.

In the illustrated preferred embodiment, conveyor belts 24 comprise the upper surface of floor 10, the lower surface of roof 12, and both the upper and lower surfaces of platform 18. Conveyor belts 24 are supported by rollers 26, spaced at regular intervals along the length of conveyor belts 24. Conveyor belts 24 are driven by drive belts 28 operatively connected to at least one of the rollers 26. Drive belts 28 are driven by one or more motors 29. In a preferred embodiment, the motors 29 may be hydraulic motors, although the invention is not so limited. Hydraulic pressure to drive the hydraulic motors may be generated by the warehouse truck 40 connected to the device at the attachment point. In one alternative embodiment, the motors 29 may be electrically powered. The motors 29 are driven at the same speed so that the belts 24 are driven at the same speed.

Various means may be employed to raise roof 12 and platform 18 with respect to floor 10. In a preferred embodiment, hydraulic pistons 31 may be employed, although the invention is not so limited. The hydraulic pistons 31 may desirably be located at the four corners of the device. This allows both for even raising of the roof 12 with respect to the floor 10, but also ensures even compression of the items 50 in the device when the pistons 31 are reversed and employed to compress the items 50 stacked in the device. Other means to raise the roof 12 and compress the items 50 stacked in the device may include electrically powered motors.

Figure 2:
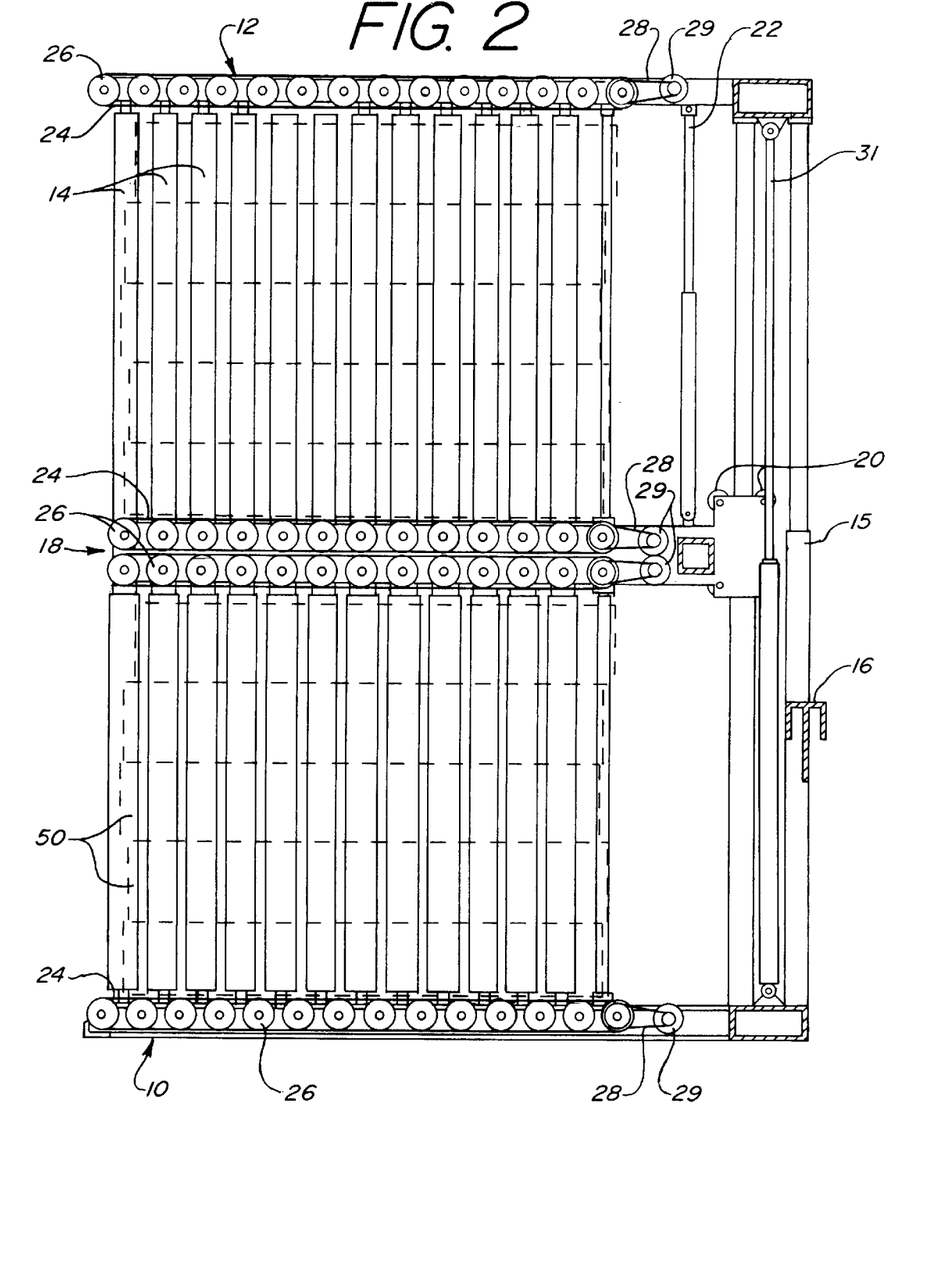
FIG. 2 is a side elevational view, partly in cross section, of a preferred embodiment of the disclosed invention with the platform and roof in the raised position.
Figure 3:
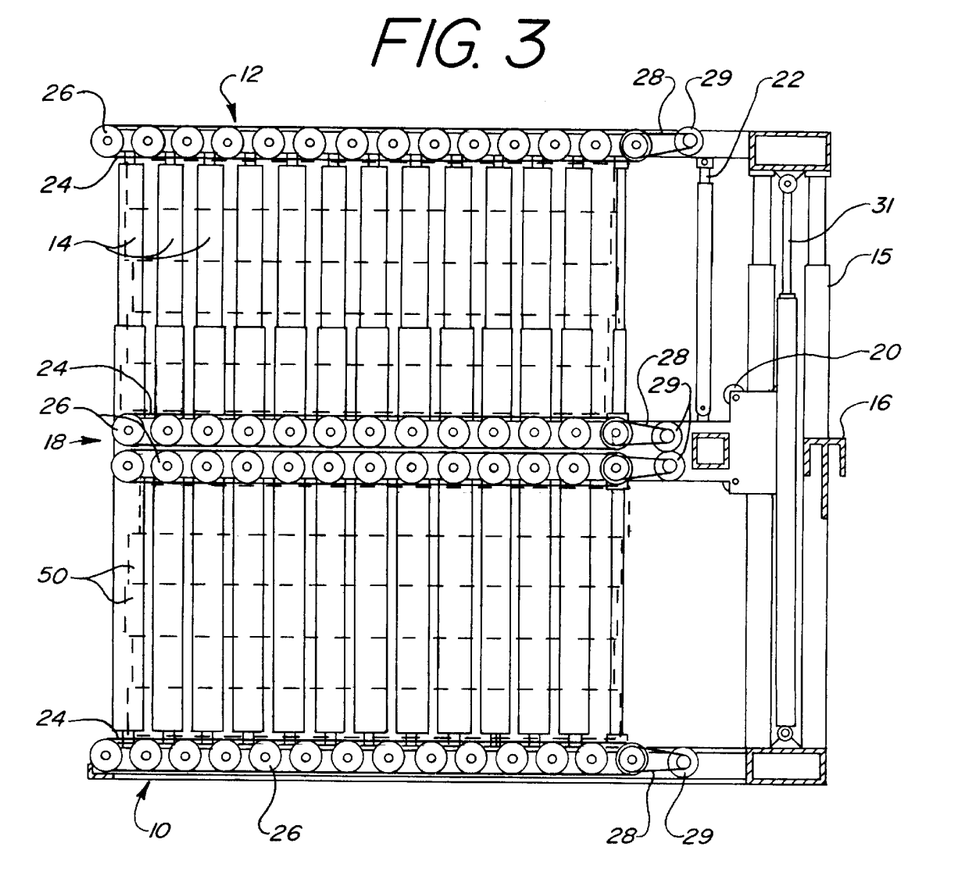
FIG. 3 is a side elevational view, partly in cross section, of a preferred embodiment of the disclosed invention with the platform partially raised and the roof in the lowered position.

Referring to FIGS. 1–4, the operation of a preferred embodiment of the disclosed invention may now be described. Loading of the device will begin with platform 18 lowered to its lowest position, as illustrated in FIG. 1. Typically, the device will be first attached to a warehouse truck 40, after which the truck 40 will drive to a point near where the items 50 to be loaded are stored. shipping personnel will then fill the space between platform 18 and roof 12 with compressible items 50. Once this operation is complete, roof 12 is raised by hydraulic pistons 31 to its highest position above floor 10, as illustrated in FIG. 2. As described above, platform 18 is carried upward when telescoping load levelers 22 are fully extended. Shipping personnel may now load compressible items 50 into the space between platform 18 and floor assembly 10. Roof 12 is then lowered by hydraulic pistons 31, as shown in FIG. 3. The items between platform 18 and floor 10, as well as the items between roof 12 and platform 18, will be compressed as a result. During this stage, platform 18 will be allowed to float freely so that the pressure on the two groups of items will be equalized. Telescoping load levelers 22 will adjust freely to allow this movement of platform 18.

Due to the size of the loaded device, an operator of a warehouse truck might experience difficulty in seeing around the device for maneuvering the loaded device around a warehouse and for precise positioning of the device in a shipping container. For this reason, an alternative embodiment of the present invention features a video camera positioned to the front of the device and operatively connected to a video display device within the visual field of the operator so that the operator has the ability to see into blind spots not directly visible to the operator from the cab of the warehouse truck. Multiple video cameras may be desirable in some circumstances and the cameras may be provided with operator controlled directional means so that the camera may be pointed by the operator from controls located in the cab of the warehouse truck.

Figure 4:
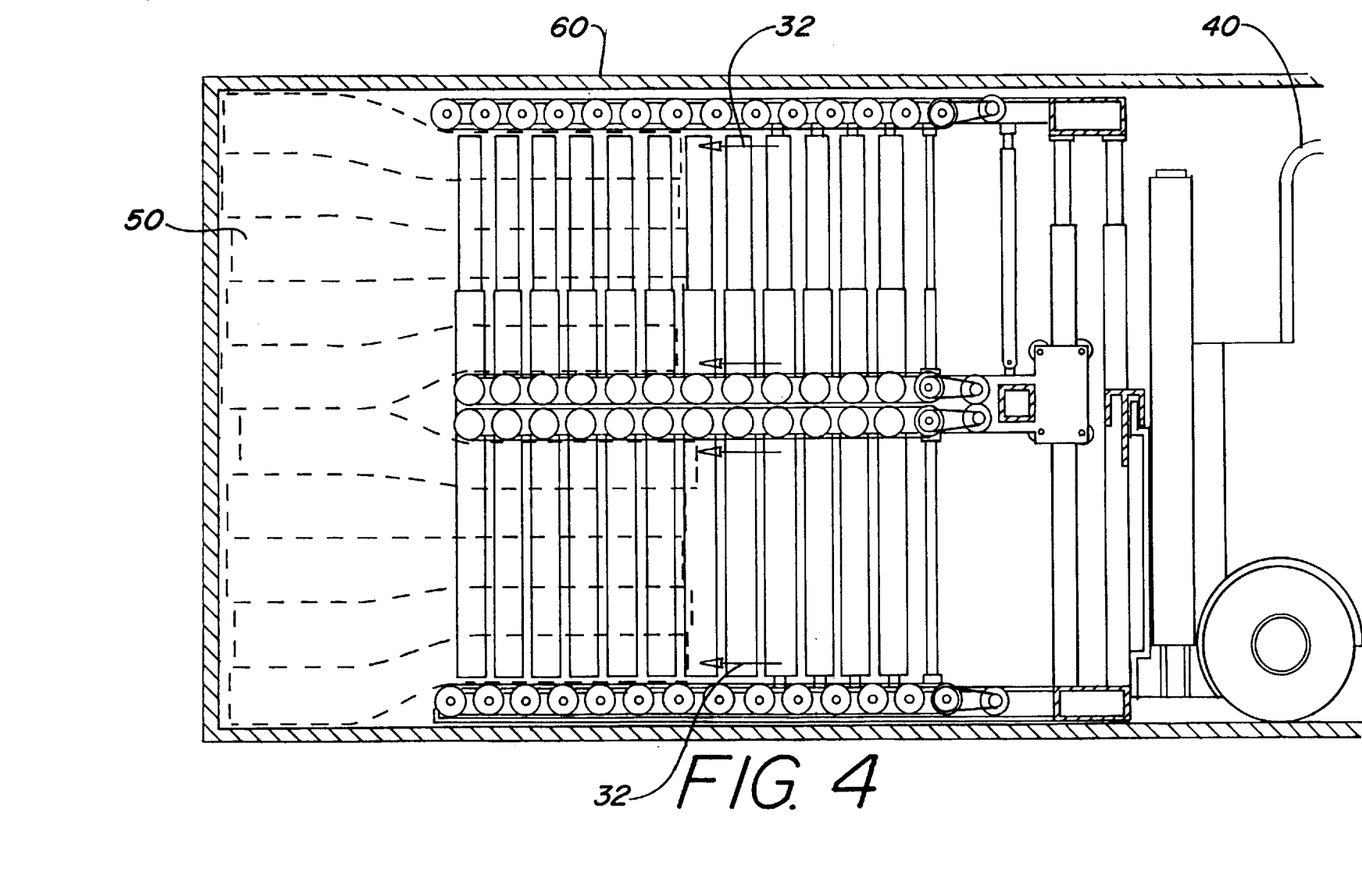
FIG. 4 is a side elevational view, partly in cross section, of a preferred embodiment of the disclosed invention attached to a warehouse truck and inside a typical shipping container.
Figure 5:
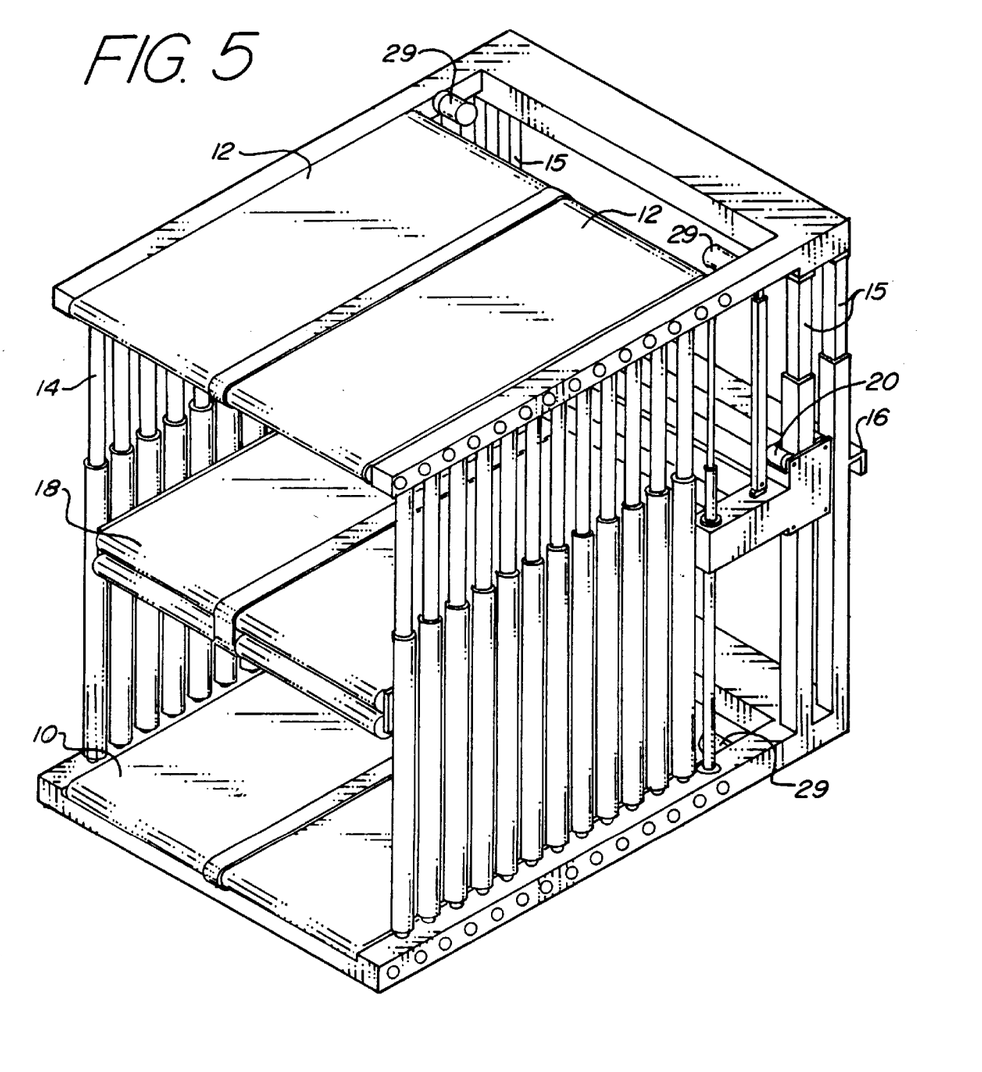
FIG. 5 is a perspective view of a preferred embodiment of the disclosed invention.

To unload the compressed items 50 from the device, a typical procedure would be to insert the entire device within a standard shipping container, such as a truck trailer 60, as shown in FIG. 4. The motors 29 that drive belts 24 will then be activated, so that the belts 24 begin turning. Both belt 24 on roof 12 and belt 24 on the lower side of platform 18 turn in a clockwise direction when viewed as shown in FIGS. 1–5. Belt 24 on floor 10 and belt 24 on the upper side of platform 18 turn in a counterclockwise direction. As a result, the items 50 compressed against belts 24 are expelled from the device in the direction indicated by the arrows 32. Collapsible tubes 14 turn freely, preventing the compressed items 50 from binding or sticking along the sides of the device during the expulsion process. Alternatively, collapsible tubes 14 include friction reducing means, such as ball rollers on the inner surfaces of the collapsible tubes 14. As the compressed items 50 are forced into the shipping container 60, the warehouse truck driver will back the warehouse truck 40 out from the container 60. The walls of the shipping container 60 hold the items 50 in a compressed state until they are unloaded when their shipping destination is reached.

In an alternative mode of operation, items 50 may be loaded into the device and compressed as described above.

Compressed items 50 may then be left in the device for storage or for shipping. If the device itself is shipped with the compressed items 50 within it, the warehouse truck 40 simply disengages from the device once the device enters the shipping container 60 as described above. When the shipping destination is reached, a warehouse truck 40 attaches to the device and removes it with the compressed items 50 still inside. To decompress the items 50, the reverse of the procedure described above for compression of the items 50 may be employed. In this way, compressed items 50 may be easily unloaded.

In an alternative embodiment adapted to the particular requirements related to loading items into a boxcar, the device may be moved by means other than a forklift or warehouse truck. For example, the device may be self-powered using, for example, hydraulic motors. The device may also be carried by a mobile overhead crane. Such cranes desirably employ hydraulic motors to power wheels that are steerable in any direction for ease of movement.

The present invention has been described with reference to certain preferred and alternative embodiments which are intended to be exemplary only and not limiting to the full scope of the invention as set forth in the appended claims.

What is claimed is:

1. An apparatus for the transportation and storage of items in a compressed state, said apparatus comprising:
   (a) a lower member, said lower member comprising a floor lying in a substantially horizontal plane;
   (b) an upper member, said upper member comprising a roof lying in a substantially horizontal plane above said floor, and said upper member being slidably connected to said lower member such that said roof may rise and fall with respect to said floor;
   (c) a platform having a lower side and an upper side, said platform lying in a substantially horizontal plane between said floor and said roof, and said platform being slidably connected to said upper member and said lower member such that said platform may rise and fall between said floor and said roof;
   (d) a rotational expulsion means, said rotational expulsion means attached to at least one of said lower member, said upper member, and said platform, whereby the rotation of said rotational expulsion means causes the expulsion of items from said apparatus;
   (e) an attachment point on said apparatus behind said floor, said roof, and said platform, said attachment point facilitating the connection of said apparatus to a vehicle; and
   (f) a translation means for raising and lowering said upper member with respect to said lower member.

2. The apparatus of claim 1 wherein said lower member and said upper member further comprise a back and two sides.

3. The apparatus of claim 1 wherein said rotational expulsion means comprises at least one conveyor belt that contacts said items while said items are within said apparatus.

4. The apparatus of claim 3 wherein two of said at least one conveyor belts are mounted at least one each on the upper and lower sides of said platform respectively.

5. The apparatus of claim 4 wherein said sides of said upper member and said lower member further comprise casters that contact said items while said items are within said apparatus.

6. The apparatus of claim 1 wherein said platform is supported by a collapsible tube comprised of at least two sections, each of said at least two sections being of progressively narrower widths, such that said narrower sections of said collapsible tube may collapse within the next wider of said at least two sections.

7. The apparatus of claim 1 wherein said translation means comprises at least one hydraulic piston.

8. The apparatus of claim 3, further comprising at least one hydraulic motor to drive said at least one conveyor belt.

9. An apparatus for the transportation and storage of items in a compressed state, said apparatus comprising:
   (a) a lower member, said lower member comprising a floor lying in a substantially horizontal plane;
   (b) an upper member, said upper member comprising a roof lying in a substantially horizontal plane above said floor, and said upper member being slidably connected to said lower member such that said roof may rise and fall with respect to said floor;
   (c) a platform assembly, said platform assembly comprising:
      (i) at least one collapsible tube aligned vertically and connected to said upper member and said lower member;
      (ii) a platform, said platform lying in a horizontal plane between said floor and said roof, and said platform being slidably connected to said at least one collapsible tube;
   (d) at least one rotational expulsion means, said at least one rotational expulsion means attached to at least one of said lower member, said upper member, and said platform, the rotation of said rotational expulsion means causing the expulsion of items from said apparatus;
   (e) an attachment point on said apparatus behind said floor, said roof, and said platform, said attachment point facilitating the connection of said apparatus to a vehicle.

10. A method for the transportation and storage of items in a compressed state, utilizing an apparatus comprised of a floor, roof, platform, and rotational expulsion means, all of said floor, roof, and platform lying in parallel planes, said floor lying below said roof, said platform lying between said floor and said roof, and said rotational expulsion means attached to at least one of said floor, said roof, and said platform, said method comprising the steps of:
   (a) loading a first group of items into a first space between said platform and said roof;
   (b) raising said platform;
   (c) loading a second group of items into a second space between said floor and said platform;
   (d) lowering said roof; and
   (e) expelling said items from said apparatus by rotating said rotational expulsion means.

11. A method according to claim 10, whereby the additional step of raising said roof occurs simultaneously with the step of raising said platform.

12. A method according to claim 10, whereby said platform is allowed to move freely both up and down during the step of lowering said roof.

* * * * *